United States Patent [19]
Tippmann et al.

[11] Patent Number: 5,381,670
[45] Date of Patent: Jan. 17, 1995

[54] APPARATUS FOR COOLING FOOD BY CONDUCTION

[76] Inventors: Joseph R. Tippmann, HRC-33, Box 8419, Rapid City, S. Dak. 57701; Vincent P. Tippmann, 8605 N. River Rd., New Haven, Ind. 46774

[21] Appl. No.: 138,961

[22] Filed: Oct. 21, 1993

[51] Int. Cl.⁶ ............................................. F25D 17/02
[52] U.S. Cl. ........................................ 62/330; 62/59; 62/434
[58] Field of Search .................... 62/59, 434, 435, 330

[56] References Cited
U.S. PATENT DOCUMENTS

| | | | |
|---|---|---|---|
| 2,226,271 | 12/1940 | Vose | 62/59 X |
| 2,538,015 | 1/1951 | Kleist | 62/434 X |
| 2,674,101 | 4/1954 | Calling | 62/59 X |
| 2,737,027 | 3/1956 | Kleist | 62/59 X |
| 4,044,568 | 8/1977 | Hagen | 62/59 X |
| 4,280,335 | 7/1981 | Perez et al. | 62/435 X |
| 4,294,083 | 10/1981 | King | 62/59 X |
| 5,056,320 | 10/1991 | Winkler | 62/59 |

*Primary Examiner*—William E. Tapoical
*Attorney, Agent, or Firm*—Joseph J. Baker

[57] ABSTRACT

A method and apparatus for cooling foodstuff to a temperature of less than 40° F. within the legally mandated time of 4 hours which consists of a refrigeration apparatus capable of forming a bank of ice and means for circulating water over the ice and through an enclosure in heat conductive relationship with a container holding the foodstuff to be cooled.

8 Claims, 3 Drawing Sheets

APPARATUS FOR COOLING FOOD BY CONDUCTION

BACKGROUND OF THE INVENTION

This invention relates to a method and apparatus for cooling by conduction a large quantity of foodstuff and more specifically by circulating water cooled by its passage over an ice bank to an enclosure in conductive relationship with a container holding the foodstuff.

It has long been a problem in the food preparation industry to be able to comply with laws, both local and federal, which require that cooked food be cooled to a temperature of 40° Fahrenheit or less within a time of 4 hours to thereby prevent the formation of harmful bacteria. This is not normally a problem with household food because the quantity is small and the domestic refrigerator can adequately cool it within the required time. Heretofore, when large quantities of food are involved, the only way of complying with these health laws was to divide the foodstuff into smaller quantities and cool them in a conventional refrigerator. This is obviously impractical for restaurants or large commercial institutions such as hospitals and the like which must prepare large quantities of foodstuff in advance of it being served. In addition, such cooling must take place without materially effecting the appearance of the food which would make it unsuitable for public consumption. For example, a foodstuff such as lasagna is usually prepared in large sheet-type pans a day in advance and must be rapidly cooled after cooking not only to comply with the aforementioned health laws but also to enable it to maintain its consistency and appearance the following day when it is reconstituted by heating and served.

Applicant has solved this problem by relying on the well-known method of heat transfer called conduction. Briefly, foodstuffs would be cooled by placing it usually in a container or directly on an enclosure such as a plate through which cooled water is circulated. The heat in the foodstuff passes directly through the bottom of the container into the enclosure and is absorbed by the cooled water. This cooling of the water circulated through the enclosure can be done by a conventional water chiller and again this may be satisfactory if the food is in small-size quantities. However, if the quantity of food is large or if it is very hot, the cooling capacity of the chiller would have to be impractically large and very complex to control the temperature of the water to prevent it from freezing. Such chillers would eventually cool the foodstuff, but it would take much longer than the legally mandated 4 hours.

Applicant has solved all of the heretofore mentioned problems of cooling large quantities of foodstuff within the mandated health temperature and time parameters for food sold or served to the general public by forming a thick bank of ice and circulating water over this ice bank and through the enclosure in conductive contact with the foodstuff itself or a container holding the foodstuff. This large reserve of 32° water, which is stored in the form of ice as the latent heat is removed therefrom, permits the heat in large quantities of food to be rapidly withdrawn by conduction to the temperature of below 40° Fahrenheit within the required 4 hours while using a relatively small amount of energy to create the bank of ice. This is because the ice can be built up on a plurality of plates in off hours when the cost of electricity is normally less and expended or melted in a relatively shorter time to achieve the aforementioned mandated degree of cooling and time frame.

It is therefore the primary object of the present invention to provide an apparatus and method for rapidly cooling large quantities of foodstuff.

It is another object of the present invention to provide an apparatus and method which is capable of cooling large quantities of foodstuff to the legally mandated requirement temperature of 40° Fahrenheit within a time of 4 hours.

It is yet another object of the present invention to provide a novel ice bank construction for supplying a large quantity of cooled water for use in any distribution system requiring it.

It is still another object of the present invention to provide a method, apparatus and system for providing a large quantity of water over an extended period of time that is relatively inexpensive to build and operate when compared to water "chillers" presently being used.

These and other objects and advantages will become apparent to those skilled in the art when the foregoing is considered in conjunction with the following brief description of the drawings and detailed description of the preferred embodiments.

DESCRIPTION OF PREFERRED EMBODIMENTS

Figure 1:
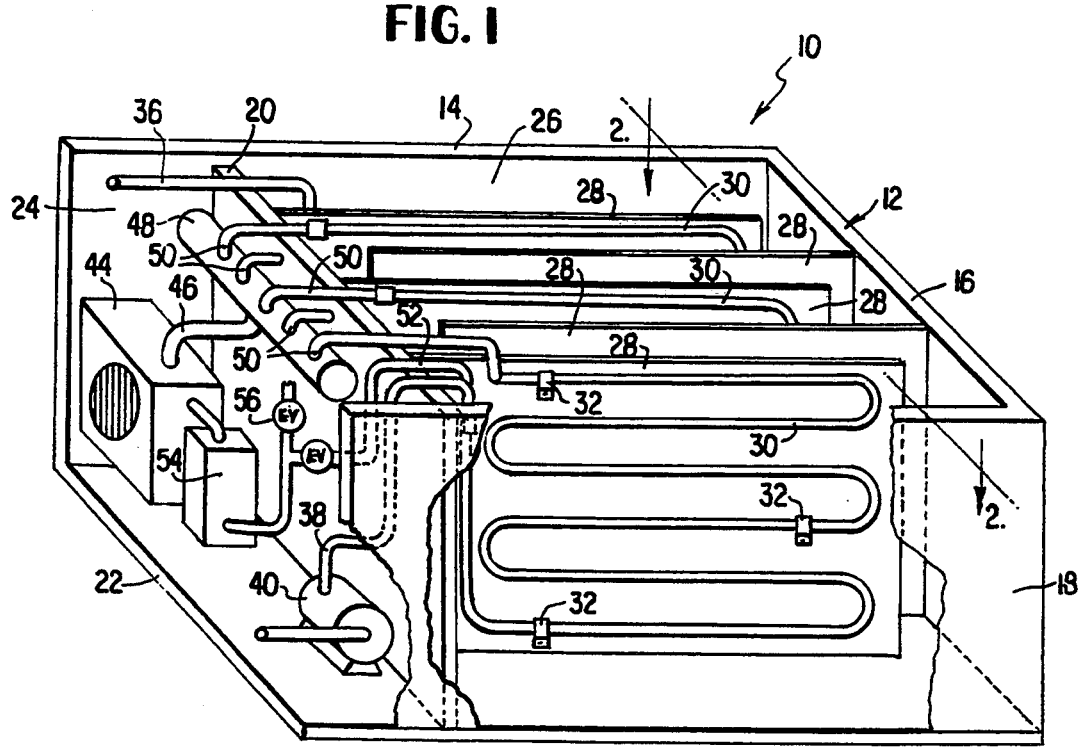
FIG. 1 is a perspective view of the ice bank apparatus of the present invention with parts broken away.

Referring now to the drawings where like characters of reference indicate like elements in each of the several views, 10 refers generally to the ice bank construction of the present invention.

The ice bank construction 10, shown best in FIG. 1, comprises an enclosure 12 consisting of three upstanding side walls 14, 16 and 18 all of equal height arranged in a U-shape and a fourth side wall 20 of a less height located between two of the side walls 14, 18 and intermediate the ends thereof. The four side walls 14, 16, 18, 20 are integrally formed at their edges to each other and to a base 22 to thereby form two rectangular shaped, open topped, compartments 24, 26. The side walls and base are constructed of a foam core of polyurethane covered on both sides by a shell of fiberglass reinforced resinous material to form a monolithic structure wherein compartment 26 is watertight. The compartment 24 has four sides to permit easy access to machinery, as will be described shortly.

Figure 2:
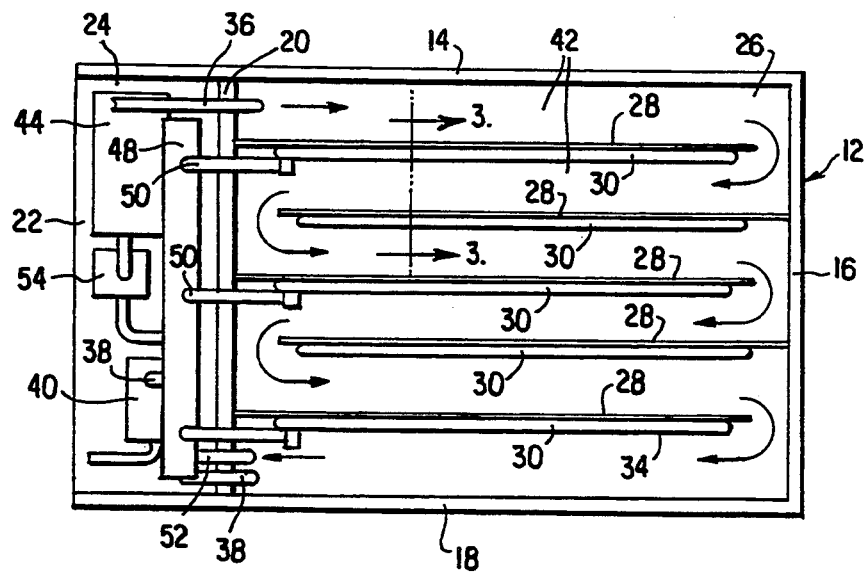
FIG. 2 is a plan view of the ice bank apparatus of the present invention taken along lines 2—2 of FIG. 1.

Referring now to both FIGS. 1 and 2, a plurality of metal sheets 28 having a flanged peripheral edge to impart rigidity thereto are located in compartment 26. Each metal sheet 28 has a serpentine-shape coil or tube 30 secured thereto in heat conductive relationship by fasteners 32. The metal sheets 28 and coils 30 combine to form plates 34, each of which have the bottom edge thereof in engagement with base 22. The plates 34 are arranged in spaced-apart relationship to each other and to the side walls 14, 18 and further have, alternatively, one vertical edge in contact with side wall 20 and spaced from side wall 16 and (alternately) one vertical edge in contact with side wall 16 and spaced from side wall 20 to thereby form a serpentine passageway, as shown by the arrows in FIG. 2. During operation, the compartment 26 is completely filled with water to a level a short distance below the top edge of the side wall 20. An inlet pipe 36 is provided for introducing water to the compartment 26 and an outlet pipe 38 is provided for withdrawing it from the compartment 26. A pump 40 is provided for circulating the water through the serpentine passageway 42 between the plates and to the place of use, as will be more fully described later.

Figure 3:
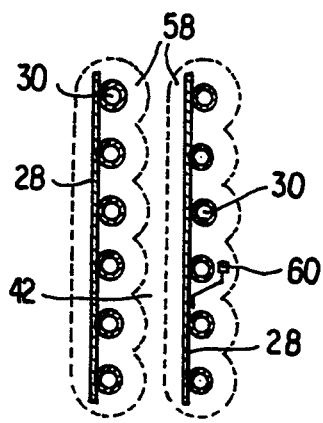
FIG. 3 is a cross-sectional view of the ice bank plates taken along lines 3—3 of FIG. 2.

A conventional refrigeration system is employed to cool the plates 34 by means of circulating refrigerant in the coils 30. A compressor/condensing unit 44 is shown in compartment 24, however, if there are space constraints, the unit can be located remote from the ice bank 10 and piped thereto. Typically, a suction inlet 46 to the compressor/condenser 44 is connected to a header system 48 to which is connected one outlet end 50 of each coil 30 of each plate 34. The inlet 52 of each coil 30 of each plate 34 is connected to a reservoir 54 for liquid refrigerant via a thermostatic expansion valve 56. In the interest of clarity, not all coil ends 50 or expansion valves 56 are shown in FIG. 1. The liquid refrigerant reservoir 54 is connected to compressor/condensing unit 44 to thereby complete the conventional refrigeration circuit from the compressor/condensing unit 44, through the coils 30 and back to the unit 44 via expansion valves 56 and reservoir 54. When in operation, the aforementioned refrigeration system will cool the coils 30 which in turn will cool the plates 34 such that water passing over the plate 34 and coil 30 will freeze and build up a plurality of thin layers until a substantial thickness of ice 58 is present on both sides of the plates 34 as can best be seen by referring to FIG. 3. A thermostatically actuated switch 60 is secured to one of the metal sheets 28 a distance therefrom equal to the desired thickness of ice to be obtained. The switch 60 controls energization of the compressor/condensing unit 44 such that when the switch 60 is substantially surrounded by the built-up ice 58, the unit 44 is shut off and when the switch 60 is exposed, the unit 44 is turned on to rebuild the ice layer 58.

Figure 4:
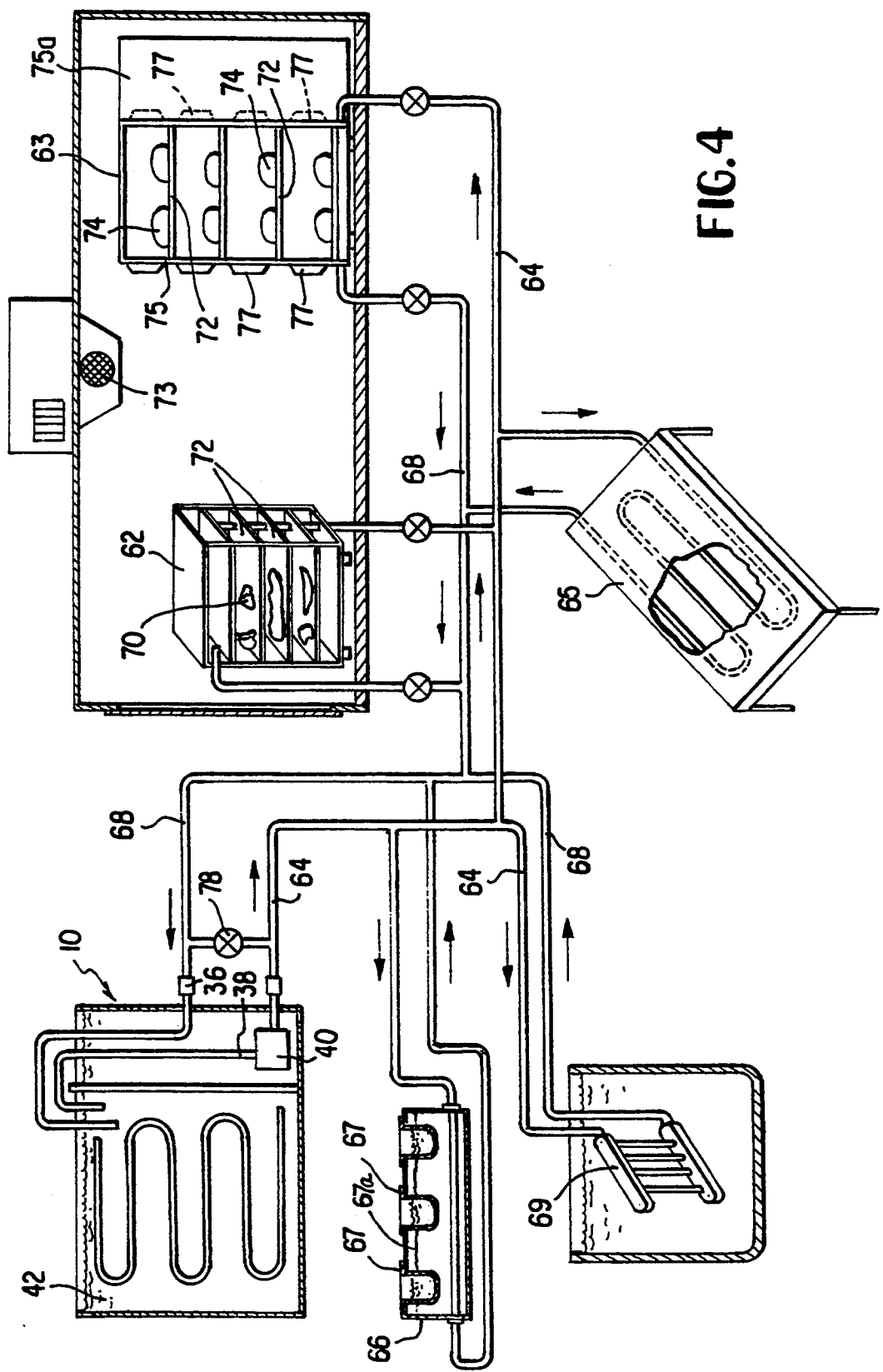
FIG. 4 is a schematic illustration of the ice bank of the present invention used in a cold water distribution system.

Referring now to FIG. 4, a system is disclosed whereby, as water is circulated by pump 40 over the ice in the bank 10, its temperature will be brought to approximately 32° F. This 32° F. water can then be pumped to any number of devices in, for example, a restaurant where rapid cooling of just prepared foodstuff is necessary by law as aforementioned or desirable to be cooled before serving. The 32° F. water can be circulated to an open rack of shelves 62 or an enclosed rack of shelves 63 as will be more fully described later, a salad bar 66 having a plurality of pots 67 containing salad dressing or the like in a heat transfer fluid 67a, a portable, hand-held grid 69 which can be inserted into any liquid such as soup to get its temperature down before serving, or to a table top 65 where it is desirable to keep plates or any other items placed thereon. The 32° F. water is pumped to the various aforementioned devices through pipes 64 and returned to the ice bank 10 by means of pipes 68. Heat absorbed by water passing through the enclosures 62, 63, 65,66 and 69 will be transferred back to the ice bank 10 where its circulation through passageways 42 will again restore its 32° F. temperature. This process will continue until all of the ice 58 is gone from the plates at which time it must be restored. Typically, the compressor/condensing unit 44 would be activated to aid in restoring the ice layer 58 even as it is being removed. This would occur as aforementioned when the switch 60 is exposed by the melting ice. The device 62 comprises a plurality of heat transfer plates or shelves 72 mounted in spaced-apart, open relationship, such as those shown in our U.S. Pat. No. 5,086,693. The plates 72 would typically support products or pans containing products 70 to be cooled by the water circulating through the plates 72. The entire device 62 would normally be located inside a walk-in type cooler, such as that shown in our U.S. Pat. No. 4,925,509. Fans 73 could also be used to enhance the circulation of cold air inside the cooler over and around the products 70. The device 63 also comprises a plurality of spaced-apart plates or shelves 72, however, the plates 72 are enclosed in a cabinet 75 having a door 75a. A plurality of fans 77 are located on either side of each plate 72 to force air across and over the product 74 to be cooled in the closed cabinet to ensure more rapid cooling by both convection and conduction. Glycol could be added to the circulated water to enable temperatures of between 26°–28° F. to be reached which would enhance the heat transfer between the water and ice and enable the product 70 in the container 71 on the heat transfer plates 72 in the device 62 or product 74 in device 66 to more rapidly reach the legally mandated temperature of 40° F. within 4 hours. In addition, because the addition of glycol permits temperatures lower than 32° F. to be reached in the water/glycol mixture if desired, foodstuffs brought into conductive heat transfer relationship with this mixture can be frozen. In order to increase the flow of water over the ice in the ice bank and also increase the turbulence thereof to enhance heat transfer by breaking down the thermal layers in the water closest to the ice, a by-pass line 76 is provided having a valve 78 therein connected between the outlet 38 of the pump 40 and the return line 36. In addition, flow control type valves (not shown) can also be provided in the various lines to control flow therethrough and thereby balance the overall flow in the entire system.

Figure 5:
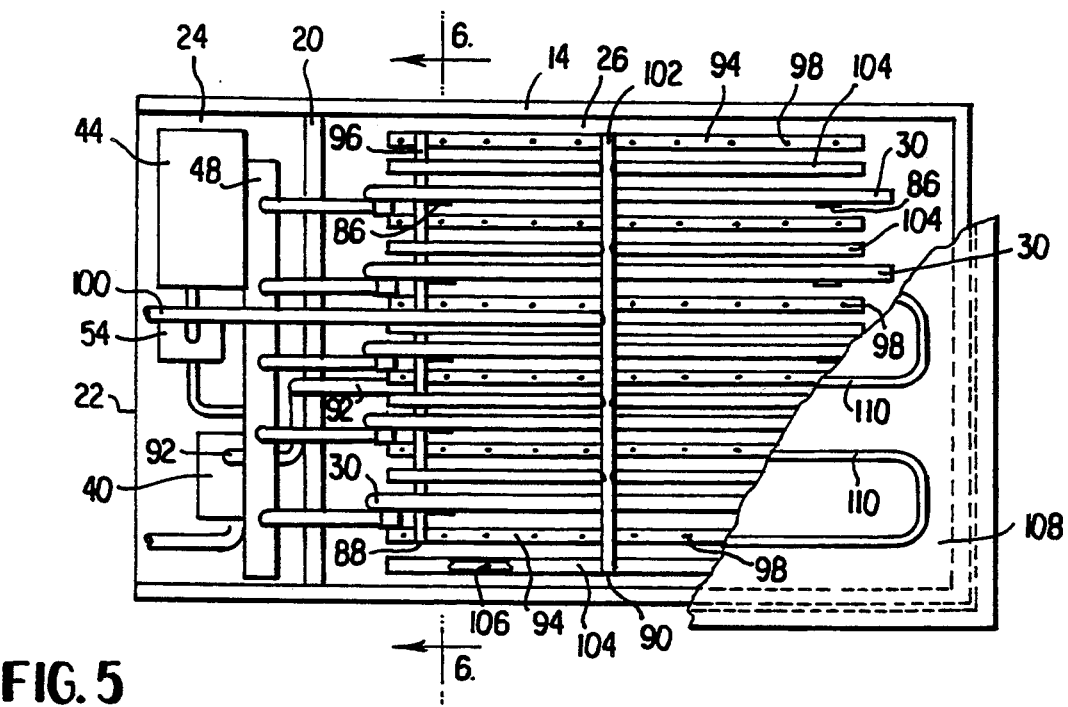
FIG. 5 is a plan view of another embodiment of the ice bank apparatus of the present invention with parts broken away.
Figure 6:
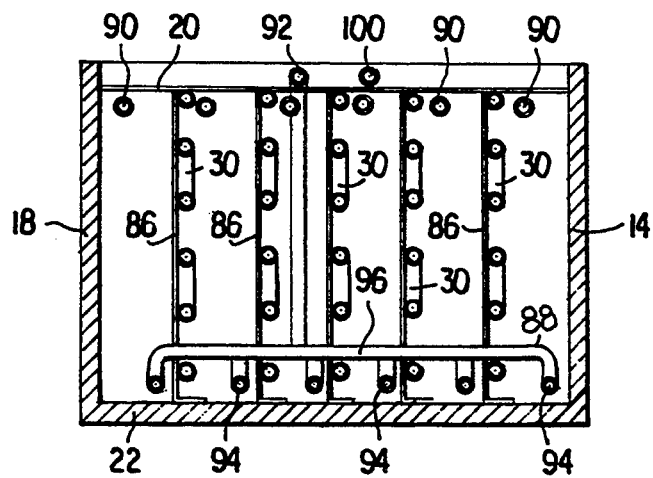
FIG. 6 is a cross-sectional view of the ice bank taken along lines 6—6 of FIG. 5.

Referring now to FIGS. 5 and 6, another embodiment of the ice bank of the present invention is shown wherein structural elements similar to the embodiment of FIGS. 1 and 2 are indicated by the same reference numerals. The primary distinction between the two embodiments resides in the elimination of the metal sheets 28 to which the coils 30 were secured to thereby provide the serpentine flow path for the cooled water. Elimination of the metal sheets 28 in this embodiment results in a completely open path for the circulating water around and through each coil 30. The coils 30 are supported in the compartment 26 by means of brackets 86. The water is introduced to the compartment 26 by means of a header system 88 and removed by means of a header system 90. An inlet pipe 92 connected to pump 40 delivers water to the header system 88 located on the bottom of the compartment 26. The header system 88 comprises a plurality of longitudinally extending pipes 94 each connected to cross-header 96 and containing a plurality of spaced-apart outlet holes 98 therein to permit water to exit the pipes into the compartment 26. Cooled water is removed from the compartment 26 by means of an outlet pipe 100 connected to the header system 90 located above the coils 30 near the top of the compartment. The outlet pipe 100 is connected to a cross-header 102 to which are connected a plurality of longitudinally extending pipes 104 each having a plurality of inlet holes 106 facing toward outlet holes 98. The water then exits the outlet holes 98 in a somewhat jet-stream fashion and agitates the water as it passes around each coil 30 to ensure good heat/cold transfer before being drawn into inlet holes 106 shown in cut-away of pipe 104 and circulated throughout the system via the cross-header 102 and outlet pipe 100. The ice bank of the embodiment of FIGS. 5 and 6 can be provided with a removable cover 108 which can serve as a work surface. As shown in FIG. 5, this cover 108 can have a serpentine coil 110 running therethrough to cool the upper surface of the cover if desired for cooling objects placed thereon.

Applicant has thus described in detail his novel apparatus, method and system for providing a sufficiently large quantity of cooled water to reduce the temperature of large quantities of foodstuff to 40° F. within the prescribed time of 4 hours to thereby comply with health laws while at the same time keeping the product's consistency and appearance such that neither is lost or substantially diminished when the product is reconstituted at a later date.

What is claimed is:

1. An ice bank comprising:
   a) an enclosure having four upstanding side walls and a bottom, one of said side walls being shorter in height than the other three and extending between two of said other side walls intermediate the ends thereof to thereby form first and second compartments, said first compartment being watertight for storing quantity of fluid,
   b) a plurality of parallel spaced-apart refrigerant coils mounted in said first compartment,
   c) means in said second compartment for circulating said water in said first compartment over said refrigerant coils, and
   d) means in said second compartment for supplying refrigerant to said coils for cooling said circulating water and forming a quantity of ice on said coils, said means being connected to said refrigerant coils by piping extending over said shorter side wall to thereby preserve the watertight integrity of said shorter side wall.

2. The ice bank of claim 1 wherein each of said refrigerant coils is mounted on a plate extending between two of said side walls and said bottom of said first compartment.

3. The ice bank of claim 1 wherein said entire enclosure is formed as a monolithic structure of fiberglass reinforced resin formed over a core of polyurethane.

4. The ice bank of claim 1 wherein alternate parallel plates have one end thereof secured to a common side wall to thereby form a serpentine channel for the flow of said fluid passed said plates.

5. The ice bank of claim 1 further comprising thermostatic means positioned a distance from said side walls for controlling said refrigerant supplying means when said layer of ice contacts said thermostatic means.

6. The ice bank of claim 1 wherein said means for circulating said water comprises an inlet piping system for introducing water to be cooled at one level in said first compartment and an outlet piping system for removing cooled water at another level in said first compartment.

7. The ice bank of claim 6 wherein said inlet and outlet piping systems comprises plurality of longitudinally extending parallel pipes each connected to a header pipe and having a plurality of spaced-apart holes therein to permit the flow of water through the walls of said pipes.

8. The ice bank of claim 1 further comprising a removable top having a piping system therein through which cooled water from said first compartment can be circulated.

* * * * *